US012752353B2

(12) United States Patent
Pertinac et al.

(10) Patent No.: US 12,752,353 B2
(45) Date of Patent: Oct. 6, 2026

(54) TIMBER PROCESSING AND FIREWOOD SPLITTING MACHINE

(71) Applicant: TAJFUN PLANINA proizvodnja strojev, d.o.o., Planina pri Sevnici (SI)

(72) Inventors: Srecko Pertinac, Sentjur (SI); David Koprivc, Sveti Stefan (SI)

(73) Assignee: TAJFUN PLANI PROIZVODNJE TROJEV D.O.O., Planina pri Sevnici (SI)

( * ) Notice: Subject to any disclaimer, the term of this patent is extended or adjusted under 35 U.S.C. 154(b) by 36 days.

(21) Appl. No.: 18/853,658

(22) PCT Filed: Feb. 15, 2023

(86) PCT No.: PCT/SI2023/000001
§ 371 (c)(1),
(2) Date: Oct. 2, 2024

(87) PCT Pub. No.: WO2023/195933
PCT Pub. Date: Oct. 12, 2023

(65) Prior Publication Data

US 2025/0229349 A1 Jul. 17, 2025

(30) Foreign Application Priority Data

Apr. 4, 2022 (SI) ................................. P-202200046

(51) Int. Cl.
*B23D 55/08* (2006.01)
*B27B 13/02* (2006.01)
(Continued)

(52) U.S. Cl.
CPC ............ *B23D 55/082* (2013.01); *B27B 13/02* (2013.01); *B27B 15/04* (2013.01); *B27L 7/06* (2013.01)

(58) Field of Classification Search
CPC ...... B23D 55/082; B23D 55/00; B23D 55/08; B23D 61/185; B23D 57/0069;
(Continued)

(56) References Cited

U.S. PATENT DOCUMENTS 1,530,682 A * 3/1925 Lyman .................... B27B 13/00
83/523
4,702,138 A * 10/1987 Hattori ................. B23D 59/001
83/785
(Continued)

FOREIGN PATENT DOCUMENTS

CA 1084814 A 9/1980
DE 202004015554 U1 1/2005
(Continued)

OTHER PUBLICATIONS

International Search Report and Written Opinion dated May 12, 2023 issued in PCT App. No. PCT/SI2023/000001 (8 pages).

*Primary Examiner* — Ghassem Alie
(74) *Attorney, Agent, or Firm* — Haynes and Boone, LLP; William B. Nash; Brooke Parker

(57) ABSTRACT

A timber processing and firewood splitting machine is provided, comprising a self-standing bearing frame for being placed on the ground, a conveying unit arranged in one terminal area of said bearing frame and configured to convey timber of a pre-determined diameter in the longitudinal direction of said bearing frame, a cutting unit suitable for cutting said timber to separate longitudinal sections of a pre-determined length, a guiding unit for guiding each timber section in said longitudinal direction and along a geometric axis (10) towards a working area (5), and a splitting unit and supporting assembly for supporting firewood pieces upon being split apart from the rest of said longitudinal section of the timber.

6 Claims, 2 Drawing Sheets

(51) Int. Cl.
*B27B 15/04* (2006.01)
*B27L 7/06* (2006.01)

(58) Field of Classification Search
CPC ....... B23D 59/002; B27B 13/04; B27B 15/04; B27L 7/06; B26D 3/28; B26D 11/163; B26D 3/006; B26D 1/46; B28D 5/0082
USPC .... 83/788.785, 307.2, 647, 651.1, 783, 784, 83/785, 786, 647.5, 646, 318, 424, 320, 83/295, 110; 125/21, 16.1, 16.2; 140/112
See application file for complete search history.

(56) References Cited

U.S. PATENT DOCUMENTS

| | | | | |
|---|---|---|---|---|
| 5,299,483 A * | 4/1994 | Ber-Fong | B26D 1/54 | 83/870 |
| 6,279,564 B1 * | 8/2001 | Hodsden | B23D 61/185 | 125/16.02 |
| 8,651,098 B2 * | 2/2014 | Shae | B23D 57/0038 | 125/16.02 |
| 9,186,805 B2 * | 11/2015 | Switatowy | B23D 59/04 | |
| 2010/0006082 A1 * | 1/2010 | Glinski | B28D 5/045 | 125/16.02 |
| 2014/0157964 A1 * | 6/2014 | Davis | B23D 57/0061 | 83/581.1 |
| 2018/0326590 A1 * | 11/2018 | Masuda | B25J 15/04 | |
| 2019/0111582 A1 | 4/2019 | Suzuki et al. | | |

FOREIGN PATENT DOCUMENTS

| | | | | |
|---|---|---|---|---|
| DE | 202005021709 U1 | 6/2009 | | |
| EP | 3031561 B1 | 6/2016 | | |
| SI | 25007 A | 12/2016 | | |
| SI | 25612 A | 9/2019 | | |
| WO | WO-9964214 A1 * | 12/1999 | B27L 7/00 | |

* cited by examiner

TIMBER PROCESSING AND FIREWOOD SPLITTING MACHINE

CROSS-REFERENCE TO RELATED APPLICATIONS

This application is a United States national phase application of co-pending International Patent Application No. PCT/SI2023/000001, filed on 15 Feb. 2023, which claims the benefit of Slovenia Patent Application No. P-202200046 filed 4 Apr. 2022, both of which are hereby incorporated by reference in their entirety.

BACKGROUND

With regard to performing operations, the present disclosure refers to wood processing, namely to firewood splitting machines, in which blades or wedges are used. Pursuant to the International Patent Classification, such inventions should belong to class B 27 L 07/06. This disclosure may also refer to working machines, namely to blade saws, in which an endless band with a plurality of cutting elements is used, such that this disclosure may also belong to class B 23 D 55/00.

The present disclosure includes methods, systems, and devices for sawing timber with minimal energy consumption and with minimal losses of wood volume, and in particular, gradually i.e. step by step, sawn to separate sections of a predetermined length, while immediately upon sawing, each particular sawn timber section is further split into firewood pieces suitable for direct application in household furnaces.

Existing machines are suitable for a so-called one-phase splitting of timber sections, which have been previously sawn to a pre-determined length, wherein such machines include a splitting unit, which may comprise either a single or multiple cutting blade. This type of machine enables splitting of said timber section of a pre-determined length either to two or more firewood pieces only in a single phase, namely on the basis of a single movement of the splitting unit relative to said timber section. Such a machine with a single cutting blade is disclosed in CA 1,084,814, which according to a productivity standpoint is inefficient and uneconomical. Another machine, which comprises several cutting edges, is disclosed in PCT/CH2005/000175 and offers some improvement with regard to the earlier mentioned machine. However, forces required for splitting are high, such that the machine is quite bulky and energy consuming, and difficult to transport to working areas.

A multi-phase firewood splitting machine is disclosed in WO 99/64214. This machine comprises a bearing frame with supporting legs and is therefore held at a desired distance above the ground. Longitudinal bearing walls of said bearing frames include guides, which are suitable for guiding a guiding frame for receiving a timber section to be split and may be displaced in the longitudinal direction of the bearing frame by the guide. A supporting plate is arranged between said bearing walls of said bearing frame, which define the longitudinal direction of the machine, and said supporting plate is configured to support a previously sawed timber section, when separated from the rest of the timber, as long as said timber section remains located within the area of said bearing frame. The length of the supporting plate should not be shorter than the length of the guiding frame or the length of the timber section being split. A driving means is included in the one terminal area of said bearing frame, and is configured to move each timber section being split relative to each disposable splitting unit, such that the guiding frame is displaced relative to the bearing frame. Said driving means is a hydraulic cylinder extending in the longitudinal direction, which is attached to said bearing frame and connects a piston race with said guiding frame. A splitting unit is arranged on the other terminal area of the bearing frame and comprises several cutting edges, including a primary cutting edge which may be in the form of a horizontal plane, as well as several secondary cutting edges, which are offset with regard to said primary cutting edge in a direction away from the guiding frame and are arranged at suitable distances apart from each other below said primary cutting edge such that each of them extends in a longitudinal direction of the machine. Each timber section is placed onto said guiding frame, upon which said guiding frame is pushed towards the splitting unit by the driving means, such that the timber section is split into several firewood pieces, which then freely fall into a collector or onto the ground below the bearing frame. Such multi-phase firewood splitting machine is also disclosed in SI 25007 A and SI 25612 A.

The timber can be sawn to several sections of a pre-determined length, which is suitable for application of firewood pieces in household furnaces or even in the area outside of the machine, e.g. by means of an engine-powered hand-operated chainsaw, which is disclosed e.g. in US 2019/0111582 A1. However, in this case the timber sections then need to be brought onto said guiding frame one by one. This type of saw is an engine-powered hand-operated saw, which comprises a suitable frame embedded within in a suitable casing with an ergonomically designed grip. The saw also comprises a chain guiding blade, which protrudes out from the casing as a plate with a semi-circular terminal area, the circumferential edge of which is configured to guide the sawing chain. A driving wheel for moving the chain, when placed thereon, is arranged within the interior of said casing and is connected with a driving engine via a shaft. Said blade is displaceable in a direction towards said chain wheel or in the opposite direction, by which tensioning of the chain may be performed, when required. The chain comprises lamellar links with outwardly directed protrusions with cutting edges formed thereon. As soon as such chain is in contact with wood, said cutting edges are rotated by the driving chain wheel and gradually begin cutting the wood such that the timber can be gradually cut over its complete depth, i.e. along the complete diameter. This type of cutting may be performed quite quickly, but the process may not be economical. For example, overcoming the friction between the links and wood and forced sliding required for sawing requires large energy consumption and is prone to overheating despite constant lubrication. The design of such a chainsaw requires a cutting width of nearly 1 cm due to the required thickness of the saw blade and chain links. This means that a large quantity of wood volume is lost during cutting timber, around 2-5%, with a proportional energy loss, which also reduces the economic viability of this type of saw.

Firewood splitting machines are also known in the state of the art, e.g. in SI 25612 A, in which a saw with an endless chain is pivotally mounted onto the bearing frame of the machine in a suitable position to enable sawing the timber into sections prior to splitting to produce firewood pieces. In this case, the saw pivots around a pivot point located outside of the circumference of the maximum available timber, while its cutting blade must be sufficiently long that the saw is able to cut the timber along its complete transversal cross-section during a single pivoting stroke and without any rotation of the timber. As soon as each portion of timber is completely loaded onto the machine, it is then cut into separate timber sections, and then split into several firewood pieces. In professional machines, the maximum thickness of timber to be processed, may go up to 50 cm or even more, requiring a saw blade and chain of corresponding length, which also requires high energy and power consumption.

Various sawing machines are also known in the field of cutting metal, where an endless flexible metallic band is used as a cutting tool, wherein said band is bent to form an endless loop with a plurality of spaced apart teeth along one longitudinal edge, each tooth furnished with cutting edges. Said endless band is placed around a pair of rolls, which are suitably spaced apart from each other, and one of said rolls is connected with a driving motor via a shaft. Such a sawing machine is disclosed in EP 3 031 561 B1 and comprises a bearing frame, in which said rolls are embedded together with said band and driving motor. The rolls are located in a vertical or horizontal plane or inclined relative to the ground. A vise, suitable for securing a working piece to be sawn is arranged in the area between said rolls, such as below a linear i.e. undeflected area of the sawing band. Sawing is performed along the vertical geometric plane, while the progression of the sawing blade through the working piece may be achieved either by displacing said vise relative to fixed rolls, or by displacing the rolls together with the sawing band in a direction towards the working piece, wherein the sawing band must be properly supported in order to avoid it sliding along the surface of the rolls in a direction away from the working piece. As mentioned, said rolls including the sawing band are inclined with respect to said vertical plane, such that the sawing band must be temporarily deflected from said inclined position into a vertical plane by a suitable rigid guide. This approach may be acceptable when processing metal, since the thickness of the working piece compared with the overall length of the band, and in particular the linear area of the sawing band between the rolls, is relatively small, such that temporarily deflection of the sawing band into said vertical plane is possible. However, when sawing timber with a much larger diameter, this approach becomes impossible as requiring an extremely large sawing machine which would be substantially larger than the firewood splitting machine itself. Despite benefits resulting from the application of such a sawing machine, such as elimination of returning strokes and corresponding savings in time and energy consumption, the deflection of the sawing band would cause substantial friction and wear despite intensive lubrication, causing correspondingly higher energy consumption and serious reliability issues of the sawing band during long-term use, regardless on the sharpness of the cutting edges thereon.

The present disclosure refers to a timber processing and firewood splitting machine. Such machine generally comprises:

- a self-standing bearing frame, which is suitable for being placed on the ground;
- a conveying unit, which is arranged in one terminal area of said bearing frame and is adjusted for step-by-step conveying of timber with a pre-determined diameter in the longitudinal direction of said bearing frame;
- a cutting unit, which is suitable for cutting said timber into separate longitudinal sections of a pre-determined length and is arranged in the area above said conveying unit;
- a guiding unit, which is suitable for guiding each particular longitudinal timber section in said longitudinal direction and along a geometric axis towards a working area, where a splitting assembly is arranged, which is configured to split each longitudinal section of the timber into several firewood pieces, wherein said splitting assembly comprises at least a splitting unit, which is movable forward and backward along said longitudinal geometric axis by a suitable driving unit, and
- a supporting assembly, which is arranged below the bearing frame at a suitable distance above the ground, and which comprises two flaps which face each other and are configured to support firewood pieces as they are split apart from the rest of said longitudinal section of the timber from said splitting unit, and are maintained in an approximately horizontal position, but may also be pivoted into an inclined or even vertical position, when necessary.

The present disclosure proposes that said cutting unit comprises a band saw with an endless saw band blade with a cutting area formed by equally spaced cutting teeth and is directed downwardly towards the ground and towards the guiding unit in the area between said conveying unit for conveying said timber and said working area with said splitting unit. Said endless saw band blade is bent to form a loop, which is located substantially in a horizontal plane and comprises a straight operational area oriented transverse with respect to said longitudinal direction of the bearing framework and also to a direction of conveying the timber, and wherein the length of said straight operational area is longer than the diameter of the maximum admissible timber or each corresponding longitudinal timber section. Said endless saw band blade is, with exception of said straight operational area, embedded within a casing of the cutting unit, and is within said casing adjusted to be run over suitable guiding rolls, at least one of which is connected with a driving means via a suitable shaft, wherein each of said guiding rolls is adapted for guiding said endless saw band blade and also for supporting said saw band blade to prevent movement between it and said rolls and said casing in a vertical direction. Said casing of the cutting unit is mounted on a column and is displaceable by means of a suitable driving unit in a controlled manner in a vertical direction at least for a distance which exceeds the maximum admissible diameter of the timber. Further, the casing may include a recess in the area adjacent to said straight horizontal working area of the saw band blade in a horizontal plane above said guiding unit, the longitudinal dimension of which exceeds the length of each admissible section of the timber in a direction of travel of the timber, while the transversal dimension of the casing corresponds to the length of said straight operational area of the saw band blade and should therefore exceed the maximum diameter of the timber or each cut-off timber section.

Embodiments of the present disclosure include three rolls for guiding and driving said saw band blade, which are located within said casing and are each rotatable around a corresponding geometric axis and arranged in corners of either a virtual equilateral triangle or a virtual isosceles triangle, which is symmetric with respect to said longitudinal geometric axis, along which the timber is conveyed, and located in a horizontal plane above said guiding unit in the area between said conveying unit for conveying said timber and said working area with said splitting unit. In further possible embodiments, four rolls are included for guiding and driving of said saw band blade, which are located within said casing and are each rotatable around a corresponding geometric axis and arranged in corners of either a virtual square or a virtual rectangle, which is symmetric with respect to said longitudinal geometric axis, along which the timber is conveyed, and located in a horizontal plane above said guiding unit in the area between said conveying unit for conveying said timber and said working area with said splitting unit. In all aforementioned embodiments the roll, which may be a driving roll, is preferably located in the area in which the casing with the endless saw band blade is mounted to said column.

BRIEF DESCRIPTION OF THE DRAWINGS

The present disclosure will also be explained in more detail by means of an embodiment, which is shown in the attached drawing, in which.

DETAILED DESCRIPTION

Figure 1:
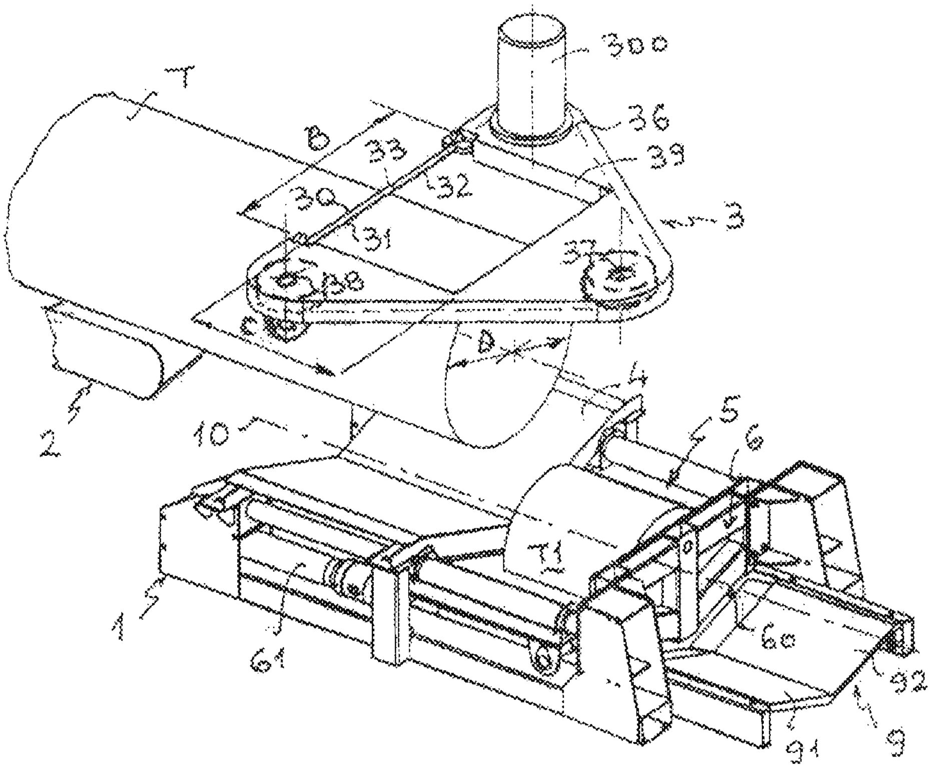
FIG. 1 is an isometric view of a timber processing and firewood splitting machine in a position just prior to cutting-off a timber section.
Figure 2:
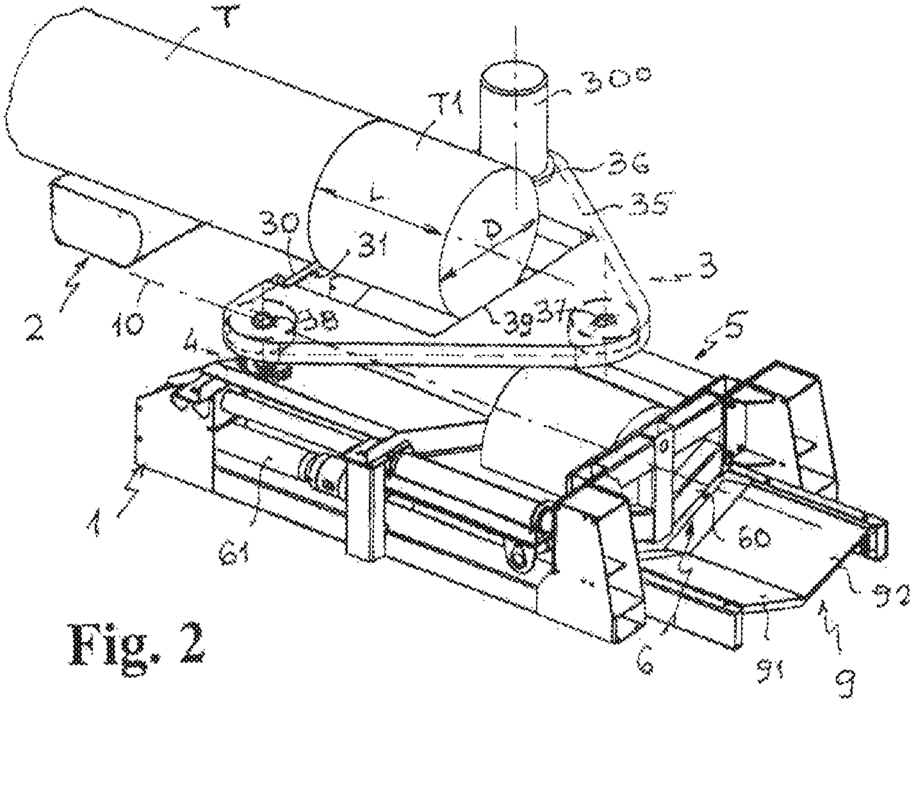
FIG. 2 is an isometric view of a machine according to FIG. 1 after said cutting-off of a timber section.

A timber processing and firewood splitting machine, which is presented in FIGS. 1 and 2, comprises:

- a self-standing bearing frame 1, which is suitable for being placed on the ground;
- a conveying unit 2, which is arranged in one terminal area of said bearing frame 1 and is adjusted for step-by-step conveying of timber T of a pre-determined diameter D in the longitudinal direction 10 of said bearing frame 1;
- a cutting unit 3, which is suitable for cutting said timber T to separate longitudinal sections T1 of a pre-determined length L and is arranged in the area above said conveying unit 2;
- a guiding unit 4, which is suitable for guiding each particular longitudinal timber section T1 in said longitudinal direction and along said geometric axis 10 towards a working area 5, where a splitting assembly 6 is arranged, which is configured to split each longitudinal section T1 of the timber T to several firewood pieces, wherein said splitting assembly 6 comprises at least a splitting unit 60, which movable back and forth along said longitudinal geometric axis 10 by a driving unit 61, as well as
- a supporting assembly 9, which is arranged below the bearing frame 1 at a suitable distance above the ground, and which comprises two flaps 91, 92 facing each other, which are configured to support firewood pieces upon being split apart from the rest of said longitudinal section T1 of the timber T and apart from said splitting unit 60, and are mainly maintained in an approximately horizontal position, but may also be pivoted into an inclined or even vertical position, when necessary.

According to the present disclosure, said cutting unit 3 is comprises a band saw with an endless saw band blade 30 with a cutting area 31 which is formed by equally spaced cutting teeth 32 and is directed downwardly towards the ground and towards the guiding unit 4 in the area between said conveying unit 2 for conveying said timber T and said working area 5 with said splitting unit 6. Said endless saw band blade 31 is bent to form a loop, which is located substantially in a horizontal plane and comprises a straight operational area 33, which is oriented transverse to said longitudinal direction 10 of the bearing framework 1 and also to a direction of conveying the timber T, and wherein the length B of said straight operational area 33 is longer than the diameter D of a maximum admissible timber T or each corresponding longitudinal timber section T1. Said endless saw band blade 31 is, with the exception of said straight operational area 33, embedded within a casing 35 of the cutting unit 3, and is within said casing 35 configured to run over suitable guiding rolls 36, 37, 38, at least one 36 of which is connected with a driving means via a suitable shaft, wherein each of said guiding rolls 36, 37, 38 is configured to guide said endless saw band blade 30 and also for supporting thereof due to preventing movement relative to said rolls 36, 37, 38 and said casing 35 in a vertical direction. Said casing 35 of the cutting unit 3 is mounted on a column 300 and is displaceable by a suitable driving unit in a controlled manner in a vertical direction at least for a distance exceeding the maximum admissible diameter D of the timber T. The casing also comprises a recess C in the area adjacent to said straight horizontal working area 33 of the saw band blade 30 in a horizontal plane above said guiding unit 4, having a longitudinal dimension along said geometric axis 10 in a direction of conveying of the timber T that exceeds the length L of each admissible section T1 of the timber T, and having a transverse dimension that corresponds to the length B of said straight operational area 33 of the saw band blade 30 and exceeds the maximum diameter D of the timber T or each cut-off timber section T1.

Figure 3:
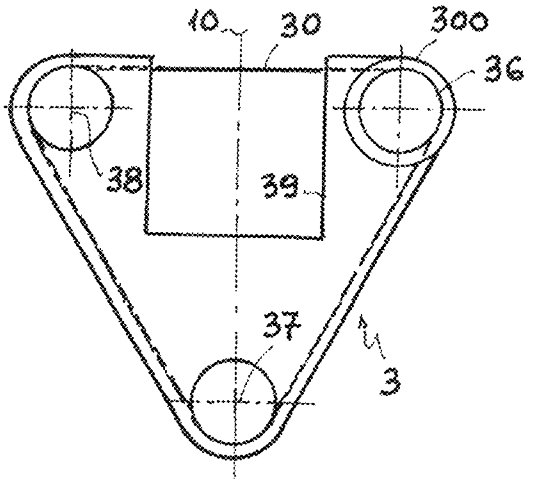
FIG. 3 is a top view of a cutting unit in which the guiding rolls are arranged in corners of an isosceles triangle.
Figure 4:
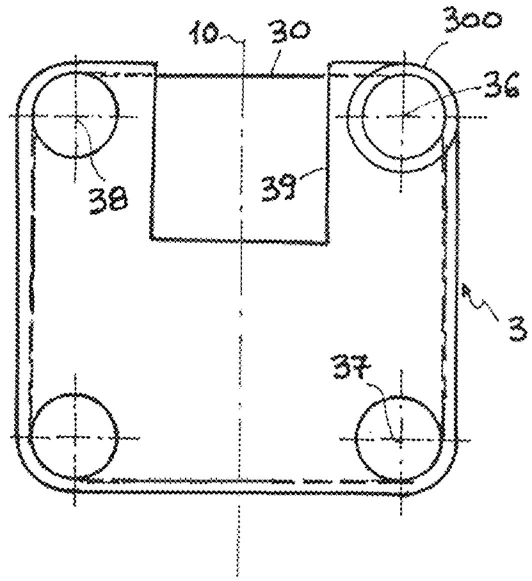
FIG. 4 is a top view of a cutting unit in which the guiding rolls are arranged in corners of a square.
Figure 5:
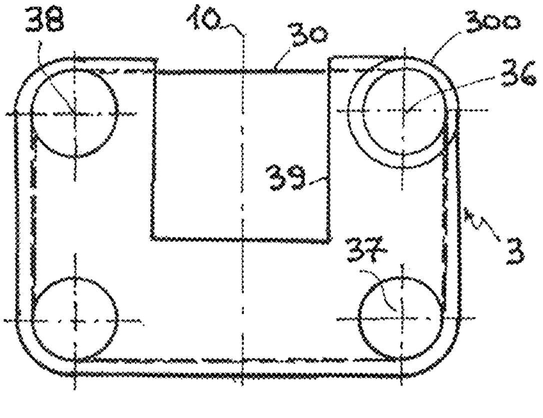
FIG. 5 is a top view of a cutting unit in which the guiding rolls are arranged in corners of a rectangle.

In the embodiment shown, three rolls 36, 37, 38 are included for guiding and driving said saw band blade 30, which are located within said casing 35 and are each rotatable around a corresponding geometric axis and arranged in corners of a virtual equilateral triangle (as shown in FIGS. 1 and 2) or isosceles triangle (as shown in FIG. 3), which is symmetric with respect to said longitudinal geometric axis 10, along which the timber T is conveyed, and located in a horizontal plane above said guiding unit 4 in the area between said conveying unit 2 for conveying said timber T and said working area 5 with said splitting unit 6. The roll 36, which is configured to be a driving roll, is located in the area in which the casing 35 and the endless saw band blade 30 are mounted to said column 300. However, another embodiment is also provided, in which four rolls 36, 37, 38 are included for guiding and driving said saw band blade 30, which are located within said casing 35 and are each rotatable around a corresponding geometric axis and arranged in corners of a virtual square (as shown in FIG. 4) or rectangle (as shown in FIG. 5), which is symmetric with respect to said longitudinal geometric axis 10, along which the timber T is conveyed, and located in a horizontal plane above said guiding unit 4 in the area between said conveying unit 2 for conveying said timber T and said working area 5 with said splitting unit 6.

When said casing 35 of the cutting unit 3 is elevated at a sufficient height (FIG. 1) that exceeds the diameter D of the timber T, then the timber T can be loaded onto a conveying unit 2, upon which it is conveyed by said conveying unit 2 until the front terminal portion of the timber T reaches the guiding unit 4. Said endless saw band blade 30 is running around said guiding rolls 37, 38 and is driven by means of a driving roll 36, while simultaneously said casing 35 is gradually displaced along the column 300 downwardly towards the ground, such that said endless saw band blade 35 gradually cuts through the timber as it is sawn across its complete cross-section (FIG. 2) relatively quickly and with low energy consumption. Upon full cutting, said casing 35 is moved upward and returned back to its initial position, upon which the timber T is conveyed at a desired distance towards the working area 5 due to activation of the conveying unit 2, wherein the rest of the timber T pushes the recently cut-off section into the working area 5, which is then split to firewood pieces by the splitting unit 6, which are then deposited on said flaps 91, 92 of the supporting unit 9.

The invention claimed is:

1. A timber processing and firewood splitting machine, comprising:

a self-standing bearing frame, suitable for being placed on the ground;

a conveying unit, which is arranged in a first terminal area of said bearing frame and is configured to convey timber of a pre-determined diameter in a longitudinal direction of said bearing frame;

a cutting unit, which is suitable for cutting said timber to separate longitudinal sections of a pre-determined length and is disposed in the area above said conveying unit;

a guiding unit, which is configured to guide each longitudinal timber section in said longitudinal direction and along a geometric axis towards a working area, where a splitting assembly is disposed, the splitting assembly configured to split each longitudinal section of the timber into two or more firewood pieces, wherein said splitting assembly comprises a splitting unit which is moveable back and forth along said geometric axis, and a supporting assembly which is disposed below the bearing frame at a suitable distance above the ground, the supporting assembly comprising two flaps facing each other which are configured to support firewood pieces upon being split apart from the rest of said longitudinal section of the timber and apart from said splitting unit, wherein said cutting unit comprises a band saw with an endless saw band blade with a cutting area which is formed by equally spaced cutting teeth, the saw band being directed downwardly towards the ground and towards the guiding unit in an area between said conveying unit for conveying said timber and said working area with said splitting unit, wherein said endless saw band blade is bent to form a loop, which is located substantially in a horizontal plane and comprises a straight operational area, the loop oriented transverse to said longitudinal direction of the bearing frame and also to a direction of conveying the timber, and wherein a length of said straight operational area is longer than a diameter of a maximum admissible timber or each corresponding longitudinal section, wherein said endless saw band blade is, with the exception of said straight operational area, embedded within a casing of the cutting unit, and is within said casing configured to run over guiding rolls, at least one of which is connected with a driving means via a suitable shaft, wherein each of said guiding rolls is adapted to guide said endless saw band blade and also to support the endless saw band blade such that movement is limited in a vertical direction relative to said rolls, and wherein said casing of the cutting unit is mounted on a column and is moveable in a vertical direction by a suitable driving unit at least for a distance exceeding a maximum admissible diameter of the timber, the casing comprising a recess in the horizontal plane above said guiding unit having a longitudinal dimension in the direction of said geometric axis of conveying the timber exceeding the length of each section, the casing having a transverse dimension of length corresponding to a straight operational area of the saw band blade and exceeding the maximum admissible diameter of the timber or each longitudinal section.

2. The timber processing and firewood splitting machine of claim 1, further comprising three rolls for guiding and driving said saw band blade, wherein the rolls are disposed within said casing and are each rotatable around a corresponding geometric axis and arranged in corners of a virtual equilateral triangle which is symmetric with respect to said longitudinal direction, along which the timber is conveyed, the equilateral triangle being located in a horizontal plane above said guiding unit in the area between said conveying unit for conveying said timber and said working area with said splitting unit.

3. The timber processing and firewood splitting machine of claim 1, further comprising three rolls for guiding and driving said saw band blade, wherein the rolls are disposed within said casing and are each rotatable around a corresponding geometric axis and arranged in corners of a virtual isosceles triangle, which is symmetric with respect to said longitudinal direction, along which the timber is conveyed, the isosceles triangle disposed in a horizontal plane above said guiding unit in the area between said conveying unit for conveying said timber and said working area with said splitting unit.

4. The timber processing and firewood splitting machine of claim 1, further comprising four rolls for guiding and driving said saw band blade, wherein the rolls are disposed within said casing and are each rotatable around a corresponding geometric axis and arranged in corners of a virtual square, which is symmetric with respect to said longitudinal direction, along which the timber is conveyed, the square disposed in a horizontal plane above said guiding unit in the area between said conveying unit for conveying said timber and said working area with said splitting unit.

5. The timber processing and firewood splitting machine of claim 1, further comprising four rolls for guiding and driving said saw band blade, wherein the rolls are disposed within said casing and are each rotatable around a corresponding geometric axis and arranged in corners of a virtual rectangle, which is symmetric with respect to said longitudinal direction, along which the timber is conveyed, the rectangle disposed in a horizontal plane above said guiding unit in the area between said conveying unit for conveying said timber and said working area with said splitting unit.

6. The timber processing and firewood splitting machine of claim 5, wherein at least one of the four rolls is a driving roll located in an area in which the casing and the endless saw band blade are mounted to said column.

* * * * *